United States Patent [19]
Howard, Jr.

[11] Patent Number: 5,248,416
[45] Date of Patent: Sep. 28, 1993

[54] SEWAGE TREATMENT SYSTEM

[76] Inventor: Ronnie E. Howard, Jr., 1208 Burris St., Henderson, Ky. 42420

[21] Appl. No.: 793,552

[22] Filed: Nov. 18, 1991

[51] Int. Cl.$^5$ ............ C02F 1/52; C02F 11/12; B01D 33/72
[52] U.S. Cl. ............ 210/195.1; 210/195.3; 210/199; 210/205; 210/206; 210/219; 210/400; 210/713; 210/738; 366/136; 366/159; 366/276; 209/210
[58] Field of Search ......... 210/195.1, 195.3, 199, 210/202, 205, 206, 219, 713, 738, 400, 194; 366/136, 152, 150, 159, 160, 276; 209/210

[56] References Cited

U.S. PATENT DOCUMENTS

| | | | |
|---|---|---|---|
| 923,571 | 6/1909 | Paterson | 366/137 |
| 1,781,435 | 11/1930 | Carper | 366/137 |
| 3,738,815 | 6/1973 | Pawloski | 366/137 |
| 4,309,291 | 1/1982 | Probstein | 210/738 |
| 4,351,730 | 9/1982 | Bailey | 210/195.1 |
| 4,358,381 | 11/1982 | Takeuchi | 210/206 |
| 4,448,539 | 5/1984 | Burgert | 366/137 |
| 4,470,907 | 9/1984 | Sencza | 210/206 |
| 4,595,499 | 6/1986 | Kormanik | 210/206 |
| 4,675,116 | 6/1987 | Hoyland | 210/206 |
| 4,844,620 | 7/1989 | Lissant | 366/136 |
| 5,124,035 | 6/1992 | Dunne | 210/206 |
| 5,133,872 | 7/1992 | Baldwin | 210/206 |

FOREIGN PATENT DOCUMENTS 2-160028  6/1990  Japan ...................... 366/341

Primary Examiner—Thomas M. Lithgow
Attorney, Agent, or Firm—Fisher, Christen & Sabol

[57] ABSTRACT

A sewage treatment system which presents a main flow line and a recirculating line, the former for flock which has appreciated in size due to the addition of a polymer and passage through an area of agitation/turbulence and the latter for the return of small sized flock to the agitator/turbulence area for size increase. The passageways of the system include movable flaps, serving recirculation purposes, and a ledge or flutter for current creation and flock build-up. Raw liquid sewage enters the system, where the outlet leads to a belt press and/or a dry bed to cake the resulting sludge.

16 Claims, 1 Drawing Sheet

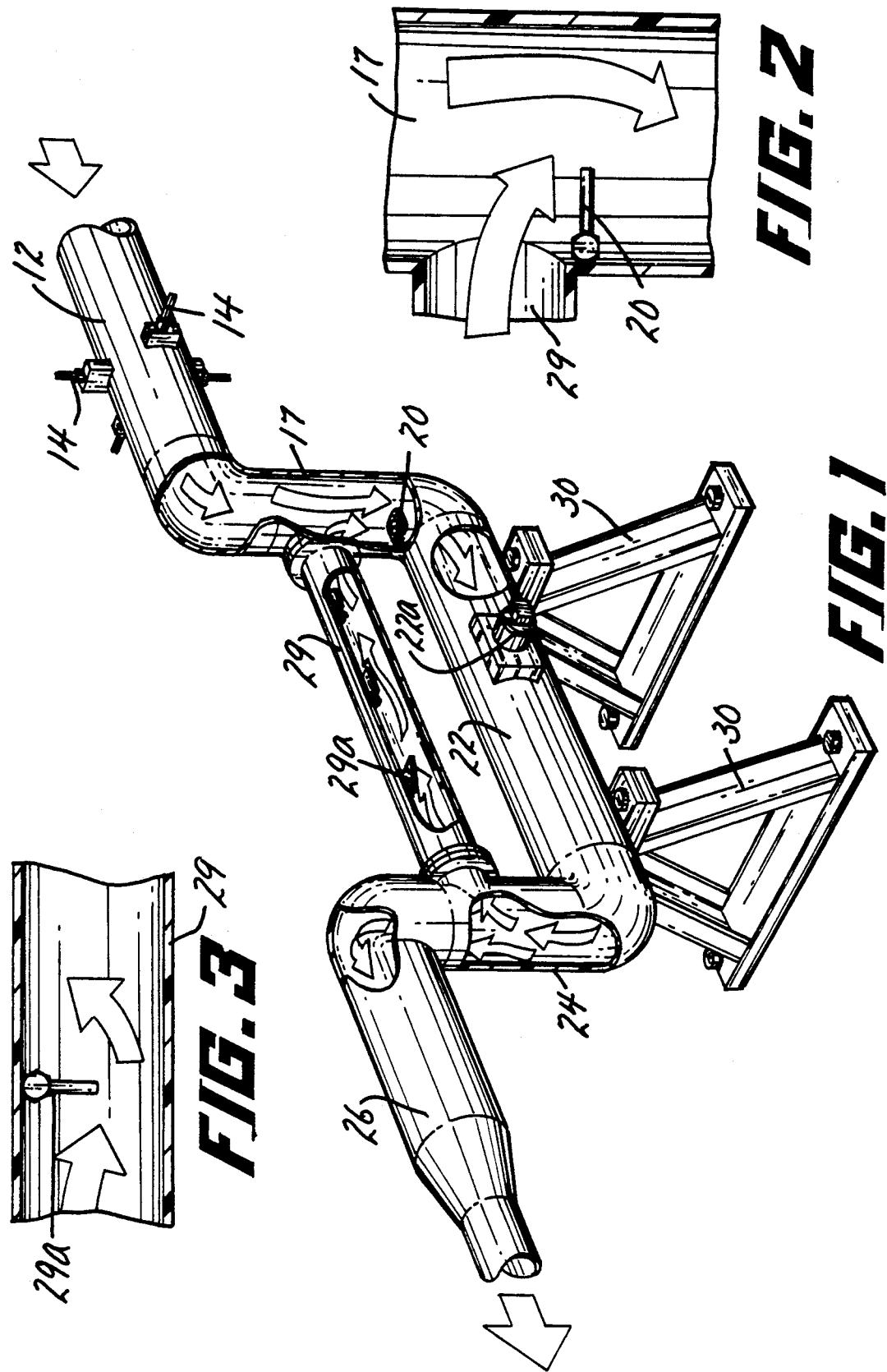

SEWAGE TREATMENT SYSTEM

BACKGROUND OF THE INVENTION

As is known, the treatment of raw sewage, as for a municipality, presents complexities in operation, particularly in achieving a maximum volume of sludge flow. In other words, and in order to maintain an orderly flow for increasing sewage demands, it has become a significant challenge to increase the gallon per minute flow rate of raw sewage and, thereafter, the amount of sludge which can be compressed, as in a belt press, and hauled to a landfill or other depository site.

DESCRIPTION OF THE INVENTION

The invention, which solves the preceding difficulty in a highly effective manner, is readily incorporated into the sewage system at the filtration plant, involving a minimum of floor space and the use of, importantly, conduits having different sized diameters.

The arrangement of the invention is interposed between the inlet sewage line and the line leading to the belt press for the resulting sludge and/or to a dry bed. The singular purpose of the invention is to create flock, i.e. solids with a minimum of water content, through separation. Restated otherwise, the invention, through turbulence or tumbler-mixer action, creates additional flock (of a larger size) which goes to output, whereas smaller flock is caused to recirculate and increase, thereby, in size for repeated passage to output.

A particular feature of the invention is the fact that no mixer equipment is required. Aside from the already mentioned different diameter sized flow conduits, i.e. the main sewage treatment conduit and the recirculating conduit, polymers are injected into the raw sewage, causing water to separate from the raw sewage during the procedure, resulting in flock build-up. The latter is caused when the polymers begin dissolving with the result that a film of concentrated polymer solution builds up about the polymer particles, forming aggregates or agglomerations, identified as "flocks" herein.

Turbulence is a key factor, where such is accomplished through a ledge (which flutters) and a series of movable flaps disposed within the recirculating conduit. In a customary installation, the equipment is leg mounted.

DESCRIPTION OF THE FIGURES

In any event, a better understanding of the present invention will become more apparent from the following description, taken in conjunction with the accompanying drawing; wherein FIG. 1 is a perspective view, particularly broken away, showing a sewage treatment system in accordance with the teachings of the present invention;

FIG. 2 is a view in elevation showing the relationship between the main sewage supply conduit and the recirculating conduit; and, FIG. 3 is another view in elevation, but, in this instance, detailing the flaps within the recirculating conduit which serve to increase flock size.

For the purposes of promoting and understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

DESCRIPTION OF THE PREFERRED EMBODIMENT

Referring now to the figures, raw sewage enters the instant arrangement in the upper right hand conduit 12 in FIG. 1 (flowing in the direction of the arrow and at approximate 4" depth), passing multiple polymer ejectors 14, causing the liquid, i.e. liquified sewage, separation.

The material then passes downwardly, in conduit 17, into a tumbler area presenting, creating mixing action and, at this point, presents flock, i.e. a solid with water, by reason of separation. A moveable flutter or ledge 20 serves a tumbling-mixing relationship.

The flock then continues through the system, in conduit 22, continually grouping the larger flock, which in turn, passes upwardly through conduit 24 to and through output conduit 26. On the other hand, the small flock recirculates, passing through recirculating conduit 29 towards conduit 17, where recirculation places the flock into further contact with the polymer and, again, large flock results.

The sludge passing from the outlet conduit 26 generally empties into a belt press and/or a dry bed (a form of filtration system) [neither shown]. A series of pivotal flaps 29a extend from the upper inner surface of recirculating conduit 29, serving stirring and mixing purposes. The recirculating conduit 29 serves the path of least resistance from the system input 12 to the system output 26.

Importantly, the belt presses, typically rated at 70 to 100 gallon per minute, are now usable, by virtue of the invention, in a 100 gallon per minute to a 225 gallon per minute range. Upon water release, the resulting sludge forms into a cake which is acceptable to most landfill operations. Support bracing 30 positions the invention at the filtration plant location, and a clean-out is provided in conduit 22.

It should be evident from the preceding that the invention serves to increase gallon per minute liquid sewage flow through an operation involving the usage of a polymer, the latter serving to increase flock size for ultimate disposition in a belt press and/or a dry bed.

Importance of the invention lies in the fact that a recirculating passageway is provided for receiving smaller size flock and reintroduce such for further tumbler-mixer action in an area proximate the entry of the polymer.

The sewage treatment system described hereabove is susceptible to various changes within the spirit of the invention, including, by way of example, in passageway length; the usage of particularized polymers; other forms of flaps and/or flutters and, the like. Thus, the preceding should be considered illustrative and not as limiting the scope of the following claims:

I claim:

1. Apparatus for flocculating fluids containing suspended solids comprising conduit means for conducting said fluid to an outlet in said conduit means, means introducing a flock-producing agent into said fluid in said conduit means, a vertical drop in said conduit means downstream from said means introducing said flock-producing agent, a movable mounted ledge means in said vertical drop serving to increase turbulence and to increase the size of accumulating flock in said fluid, a vertical rise in said conduit means, downstream from said vertical drop leading to said outlet, said conduit means including means connecting said vertical drop to said vertical rise, and are circulation passageway means connecting said vertical rise to said vertical drop for recirculating smaller size flock to said vertical drop.

2. Apparatus of claim 1 wherein said recirculation passageway means includes movable flaps movably mounted in said recirculation passageway means for providing increased agitation.

3. Apparatus of claim 1 wherein the cross-sectional size of said recirculation passageway means is smaller than that of the conduit means.

4. Apparatus of claim 3 wherein the cross-sectional size of said recirculation conduit means is smaller than that of said passageway.

5. Apparatus of claim 3 wherein said means introducing a flock-producing agent comprises a plurality of injector jets spaced around the periphery of said conduit means upstream from said vertical drop.

6. Apparatus of claim 3 wherein said introducing a flock-producing agent comprises four injector jets spaced around the periphery of said conduit means upstream from said vertical drop.

7. Apparatus of claim 3 wherein said conduit means narrows at a location downstream from said vertical rise.

8. Apparatus of claim 1 wherein said recirculation passageway means communicates with said vertical drop at a location above said ledge means.

9. Apparatus of claim 1 wherein said means for introducing a flock-producing agent comprises a plurality of injector jets spaced around the periphery of said conduit means upstream from said vertical drop.

10. Apparatus of claim 1 wherein said means introducing a flock-producing agent comprises four injector jets spaced around the periphery of said conduit means upstream of said vertical drop.

11. Apparatus of claim 1 wherein a clean-out port is provided said conduit means.

12. Apparatus of claim 1 wherein said conduit means narrows at a point downstream from said vertical rise.

13. Apparatus of claim 1 wherein said outlet empties into a belt press filtration system.

14. Apparatus of claim 1 wherein said outlet empties into a drying bed filtration system.

15. Apparatus of claim 3 wherein said outlet empties into a belt press filtration system.

16. Apparatus of claim 3 wherein said outlet empties into a drying bed filtration system.

* * * * *